June 24, 1969  R. E. RESSEGUIE  3,451,270
THERMOSTATIC VACUUM VALVE AND BIMETAL ELEMENT THEREIN
Filed Nov. 14, 1966

INVENTOR.
Robert E. Resseguie
BY
George E. Johnson
ATTORNEY

United States Patent Office 3,451,270
Patented June 24, 1969

3,451,270
THERMOSTATIC VACUUM VALVE AND BIMETAL ELEMENT THEREIN
Robert E. Resseguie, Flint, Mich., assignor to General Motors Corporation, Detroit, Mich., a corporation of Delaware
Filed Nov. 14, 1966, Ser. No. 594,135
Int. Cl. G01k 5/62
U.S. Cl. 73—363.5                                    3 Claims

ABSTRACT OF THE DISCLOSURE

An elongated bimetal element in elliptical form especially adapted for sensitive thermostatic control of a vacuum valve. An enclosed chamber which is part of a vacuum flow path, has a port therein acting as a vent port. The bimetal element, which is located inside the chamber, modulates the vent port opening as a function of temperature control the vacuum established.

---

This invention relates to valves and more particularly to thermostatic valves for controlling vacuum and a special bimetal element adapted for but not necessarily limited to use in such valves.

A vacuum control valve actuated by a bimetal element is disclosed in the U.S. Patent 3,319,888 granted May 16, 1967 in the name of John E. Creager and which is entitled, "Vacuum Operated Automotive Temperature Control System." The present invention pertains to an improvement over the valve assembly and also over the bimetal element as disclosed in that patent application.

An object of the present invention is to provide a thermostatically actuated valve capable of quickly sensing temperature changes and simultaneously effecting corresponding changes in vacuum controlled by the valve. Another object is to provide a temperature sensing element capable of fast response and operation free of frictional effects inimical to calibration.

A feature of the present invention is a thermostatic valve having an elongated or elliptical bimetal element confined in a protective body of the valve and adapted to control fluid flow through the latter. Another feature is a unitary elongated bimetal element which is adapted to flex with substantially no friction interference when subjected to a temperature change to which it is sensitive and quickly responsive.

These and other features of the invention will become apparent as the description proceeds.

Figure 1:
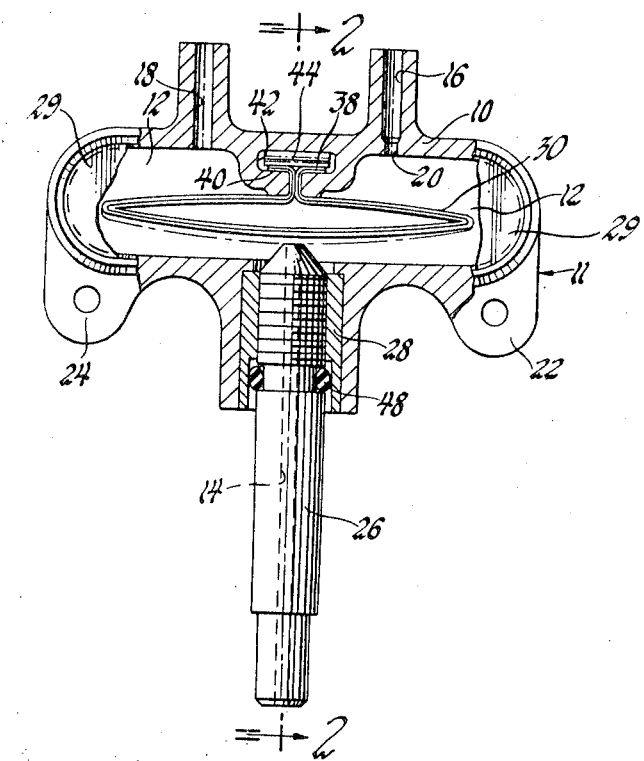
FIGURE 1 is a sectional view through a vacuum valve constituting one embodiment of the present invention.
Figure 2:
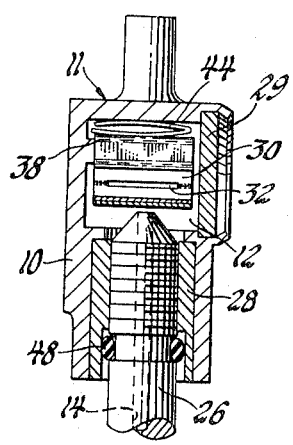
FIGURE 2 is a sectional view as seen looking in the direction of the arrows 2—2 in FIGURE 1.

In the drawings, FIGURE 1 shows the body 10 of a valve broadly indicated at 11 and this body defines a fluid flow chamber 12 having a vent 14 leading from the chamber and a pair of spaced ports 16 and 18 constituting part of a vacuum line or path of flow. The port 16 is somewhat restricted at 20 to constitute an inlet to the valve 11 from a source of vacuum supply. The port 18 constitutes a port for vacuum modulated or regulated in extent and in accordance with the operation of the valve 11. The valve body 10 has two ears 22 and 24 by means of which the body may be supported on, for example, the fire wall of an automobile if the valve is to be used in controlling vacuum originating from the intake manifold of the automobile engine.

The vent 14 constitutes a bore in a cylindrical member 26 which is held in threaded relation with respect to the body 10 and in a sleeve 28 tightly driven into the body.

Figure 3:
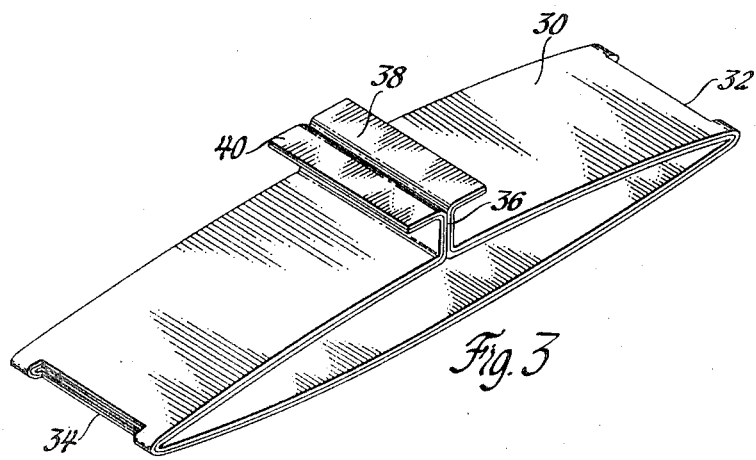
FIGURE 3 is an enlarged and perspective view of a bimetal element used in the valve assembly of FIGURES 1 and 2.

Protected within the body 10 is an elliptical bimetal element 30 of unitary construction. It is made of conventional bimetal materials; that is, two differing metals joined together in the flat form giving a laminar construction and then bent to the elliptical shape as most clearly shown in FIGURE 3. The ends of the element 30 bear cutouts 32 and 34 to facilitate flexibility of the element. It will be noted that the element is of unitary construction and that an intermediate portion of a long side of that element shows a cleavage as at 36 because that portion constitutes ends of the element (in the flat) and bears oppositely extending flanges 38 and 40 whereby the element may firmly be held with the aid of a small recess 42 formed in the body 10 and with a major portion of the element out of contact with the body.

In the particular embodiment of the valve shown, a C-shaped spring 44 is retained in the small recess 42 tightly to hold the flanges 38 and 40 in fixed position with respect to the body 10. It will benoted that, except for the intermediate supporting portion of the bimetal element 30, all other parts of the element are out of contact with the body 10 although, as will be seen as the description proceeds, the other long side of the bimetallic element is adapted to contact the end of the cylinder 26 and close the vent 14 when the proper temperature for that operation obtains. An insert 29 is locked in place at the back of the body 10 to seal the latter after the element 30 and spring 44 are in place.

Because of a threaded connection between the cylinder 26 and the body 10, the distance between the end of the vent 14 and the element 30 may be varied. This constitutes a means for calibrating the valve, i.e., predetermining the temperature at which the valve will open and close. A sealing ring 48 is interposed between the cylinder 26 and the sleeve 28.

In the operation of the valve 11, raw vacuum is supplied to the port 16 and, if the vent 14 is open, any vacuum at the port 18 will be relieved because of the admission of atmospheric air through the vent 14. If, however, the temperature of the air entering the vent varies sufficiently and rises such as to cause the element 30 to arch to its dot and dash position, as seen in FIGURE 1, the element itself will close the vent and the vacuum at the port 18 will be raised to a maximum extent. At intermediate positions of the bimetal element 30, the extent of vacuum in the port 18 will be modulated in accordance with the temperature of the small quantity of air admitted by way of the vent 14 and "washing" over the element 30.

There are a number of advantages to this construction such as:

(1) High sensitivity (giving considerable vacuum change at port 18 for a small temperature change in air admitted through the vent) stemming from efficient utilization of bimetal and the elliptical shape enabling a "long" element to be packaged within a small space;

(2) Fast response resulting from air flowing over a large area of the low mass of bimetal in the element 30. The effect of stagnant air and thermal skin effects (layers of insulating dead air) are eliminated;

(3) The absence of hysteresis. The small "hinges" due to the cutouts 32 and 34 at the ends of the elliptical form flex easily and this results in absence of mechanical friction as the element 30 flexes in response to temperature change;

(4) A separate valve seat element or valve pad is not needed, although it could be used, as the element 30 moves toward and away from the vent directly to modulate the opening in relation to temperature. This avoids the sticking shut of a pad seat particularly after being out of service for a long period. It also avoids the taking of a permanent set by a pad because of an imprint of the cooperating vent face on the pad. Such a set would result in system calibration drift in the course of time.

While the bimetal element 30 is shown specifically for use in the vacuum valve 11, it should be appreciated that the field of use of the element 30 could encompass any application thereof wherein the flow of a fluid should be related to temperature to which the element is subjected. This elliptical one piece form of bimetal element represents a preferred construction but it will be appreciated that substantially or somewhat straight but long bimetal side pieces could be used with end spacers permitting a hinge action—all as a unitary but fabricated or built-up version to gain substantially the same effect—a sensitive device not influenced by friction. Such a modified construction would come within the purview of the present invention.

I claim:

1. A bimetallic element in elongated form comprising: one continuous oval-shaped strip, said strip having two long sides joined to each other by bent end portions, said two long sides of said element being spaced from each other, an intermediate portion on one long side having a configuration adapted to support said element, the other long side of said element being continuous and unbroken, the bent end portions of said element joining said long sides having cutouts which reduct friction and hysteresis when said long sides move with respect to one another caused by temperature change.

2. A bimetal element as set forth in claim 1, in which said element includes a cleavage in said intermediate portion, said cleavage bearing oppositely disposed flanges for supporting said element, said cleavage and said flanges formed in the ends of said continuous strip.

3. A bimetallic element comprising: first and second elongated bimetallic strips, each of said strips including opposite ends having cutouts therein, said two strips being located in spaced parallelism from each other, a supporting tab on said first strip adapted to support said element, said second strip being continuous and unbroken, means integrally joining said strips at said cutout ends, said means and said cutouts cooperating to impart greater flexibility than adjoining segments of said strips which reduces friction and hysteresis when said long sides move with respect to one another caused by temperature change.

References Cited

UNITED STATES PATENTS

| 2,249,837 | 7/1941 | Lee | 73—363.5 |
| 2,939,320 | 6/1960 | Frey et al. | 73—363.5 |
| 3,344,672 | 10/1967 | Lingnau | 73—363.5 |

LOUIS R. PRINCE, *Primary Examiner.*

WILLIAM A. HENRY II, *Assistant Examiner.*